2,925,802
STROKE CONTROL FOR FLUID MOTORS

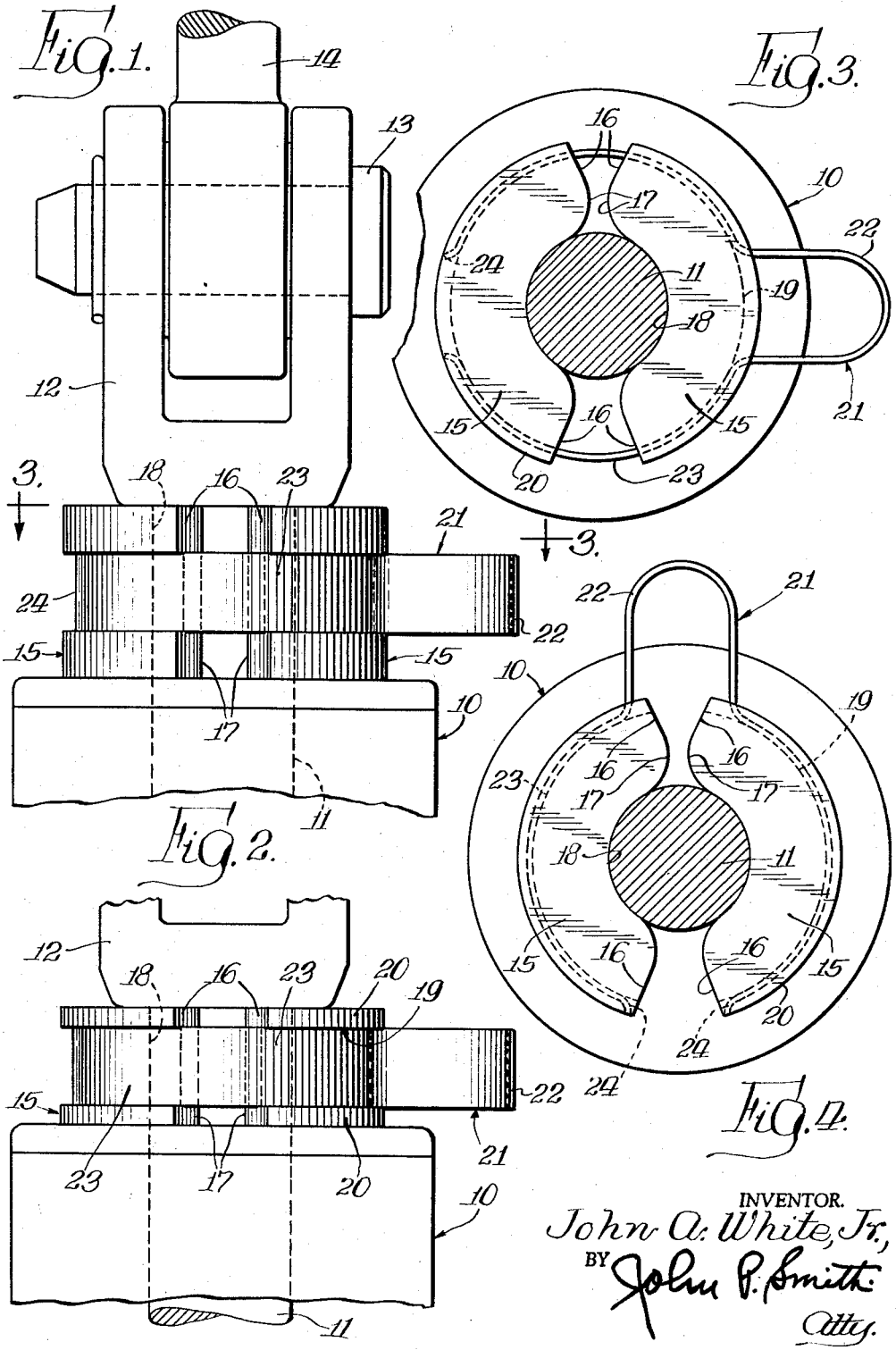

John A. White, Jr., Gilroy, Calif., assignor to Be-Ge Manufacturing Co., a corporation of California Application January 21, 1958, Serial No. 710,246

4 Claims. (Cl. 121—38)

The present invention relates generally to fluid motors, but more particularly to a simple and improved construction of a stroke control for fluid motors in the form of semi-circular collars of different lengths which are adapted to be quickly attached to or detached from the piston rod of a fluid motor for varying the stroke of the piston rod with respect to the cylinder.

The primary object of the present invention is to provide a novel and improved quickly attachable and detachable stroke control device for fluid motors in the form of semi-circular collars made in various lengths so as to vary the stroke of the piston rod, for example, one inch to six and three-quarter inches by increments of a quarter of an inch.

A further object of the invention is to provide a novel and improved stroke control device for fluid motor in the form of substantially semi-circular collars having peripheral recesses therein so as to be adapted to receive and retain therein a complementary spring member which may be revolved with respect to the semi-circular collars so as to lock the collars and prevent their dislodgement from the piston rod which sometimes occurs by reason of the vibration of the fluid motor.

These and other objects are accomplished by providing a construction and an arrangement of the various parts in the manner hereinafter described and particularly pointed out in the appended claims.

Referring to the drawings:

Fig. 1 is a fragmentary side elevational view of a conventional form of fluid motor showing my improved stroke control device mounted therein;

Fig. 2 is a view similar to Fig. 1 showing my improved stroke control device of a different length than that shown in Fig. 1;

Fig. 3 is a cross-sectional view taken on the line 3—3 in Fig. 1 showing the spring-like clamp revolved ninety degrees for the purpose of locking the semi-circular collars to the piston rod of the fluid motor; and Fig. 4 is a cross sectional view similar to that of Fig. 3 except the spring-like member is shown in its normal position preparatory to removing the device from the piston rod of the fluid motor.

In illustrating one adaptation of my improved stroke control device for fluid motors, I have shown the same in connection with a conventional form of fluid motor, generally indicated by the reference character 10. The conventional hydraulic cylinder comprises generally a piston (not shown) connected to the inner end of a piston rod 11. Secured to the outer end of the piston rod 11 is the usual clevis 12. The clevis 12 is generally pivotally connected by means of a pin 13 to a part 14 to be operated by the fluid motor.

My improved hydraulic stroke control device includes two oppositely disposed substantially semi-circular collars having their opposite ends diverging as shown at 16. The inner portions 17 are substantially curved or rounded, as shown at 17, in such a manner that the curved portion is substantially tangent to the inner arcuate portion 18 of the collar members 15. The arcuate portion 18 of the members 15 may be made of a variety of radii so as to conform to different sizes of piston rods. The outer periphery of the semi-circular collars 15 are provided with an annular or circular recesses 19 located between the upper and lower spaced annular flanges 20. Adapted to be detachably mounted in the annular recess 19 of the semi-circular collars 15 is a detachable flat steel spring member, generally indicated by the reference character 21. This spring member 21 is provided with a hand grip portion in the form of a hairpin loop as shown at 22 and has its intermediate opposite portions bowed outwardly in the form of substantially semi-circular extensions 23 so as to be complementary to the recesses 19 of the semi-circular collar members 15 as clearly shown in the drawings. The extreme outer free ends of the semi-circular portions 23 of the spring member 21 are curved outwardly, as shown at 24, so as to facilitate the rotation of the spring-like member 21 when it is revolved with respect to the collar section 15, from the position shown in Fig. 4 to the position shown in Fig. 3 of the drawings for locking the semi-circular members against displacement on the piston rod 11. In other words, these curved ends 24 will easily ride over the projecting ends of the semi-circular members in the operation of revolving the spring-like member 21.

From the above description it will be readily seen that the collars 15 are made of different lengths, the one shown in Fig. 2 being smaller than the one shown in Fig. 1 so that a wide variety of stroke limitations of the fluid motor may be obtained.

Summarizing the advantages and function of operation of the present invention, it will be readily observed that with the curved portions of the clamping spring mounted in the peripheral recesses of the collars it is a simple matter to spread the free ends of the semi-circular collars over the piston rod so as to yieldingly engage the rod. Then by placing a number of different length collar devices on the rod, the stroke of the fluid motor may be controlled. It will also be noted that by revolving the spring on the annular recesses of the semi-circular collars through an angular displacement of approximately ninety degrees with respect to the collars, the same is securely locked in position in the piston rod so as to prevent its displacement therefrom.

While in the above specification I have described one embodiment which my invention may assume in practice, it will, of course, be understood that the same is capable of modification and that modification may be made without departing from the spirit and scope of the invention as expressed in the appended claims.

What I claim as my invention and desire to secure as Letters Patent is:

1. A stroke control device for a piston rod of a fluid motor comprising two oppositely disposed substantially semi-circular members adapted to be detachably secured to a piston rod, said members having annular recesses in the outer portions of the peripheries thereof, a curved flat spring complementary to said annular recesses and seated therein, and outwardly curved free ends formed on said spring for facilitating the rotation of said spring with respect to said members whereby said members may be locked to said rod.

2. A stroke control device for a piston rod of a fluid motor comprising two oppositely disposed segments of a circular collar adapted to be detachably secured to a piston rod, a spring substantially embracing said segments for clamping said segments to said rod, means formed on the outer portions of said segments for seating and retaining said spring in position on said segments, and outwardly curved portions formed on the outer free end of said spring for facilitating the rotation of said spring with respect to said segments whereby said segments may be locked on said rod.

3. A stroke control device for a piston rod of a fluid motor comprising two oppositely disposed segments of a circular collar adapted to be detachably secured to a piston rod, a spring substantially embracing said segments for clamping said segments to said rod, a loop-like hand grip formed integrally wtih said spring, oppositely disposed bowed-out portions connected to said loop and adapted to engage the outer portions of said segments, and outwardly curved portions formed on the free ends of said spring to permit the spring to freely ride over the ends of said segments when the spring is rotated with respect to said segments.

4. A stroke control device for a piston rod of a fluid motor comprising a pair of arcuate collar portions adapted to be oppositely disposed in engagement with a piston rod, each collar portion having a groove extending along the outer periphery thereof, and a spring member mounted in the grooves of said collar portions for clamping said collar portions to said piston rod, said spring member having an open portion and being rotatable in said grooves with respect to said collar portions to align said open portion with a pair of adjacent ends of said arcuate collar portions for insertion of said collar portions and said spring member over said piston rod and having a handle portion opposite said open portion and being rotatable in said grooves with respect to said collar portions to dispose said open portion between the ends of one of said arcuate collar portions and overlap both pairs of adjacent ends of said collar portions with said spring member.

References Cited in the file of this patent

UNITED STATES PATENTS

| | | |
|---|---|---|
| 938,302 | Davis | Oct. 26, 1909 |
| 1,288,973 | Osborn | Dec. 24, 1918 |
| 1,597,525 | Knake | Aug. 24, 1926 |
| 2,288,511 | Bratz | June 30, 1947 |
| 2,442,306 | McCormick | May 25, 1948 |
| 2,654,404 | Neuhauser | Oct. 6, 1953 |